United States Patent
Shen et al.

(10) Patent No.: US 11,795,244 B2
(45) Date of Patent: Oct. 24, 2023

(54) SURFACTANT COMPOSITION (71) Applicant: Dow Global Technologies LLC, Midland, MI (US)

(72) Inventors: Cheng Shen, Shanghai (CN); Jianhai Mu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 894 days.

(21) Appl. No.: 16/324,930

(22) PCT Filed: Aug. 12, 2016

(86) PCT No.: PCT/CN2016/094885
§ 371 (c)(1),
(2) Date: Feb. 12, 2019

(87) PCT Pub. No.: WO2018/027907
PCT Pub. Date: Feb. 15, 2018

(65) Prior Publication Data
US 2021/0301041 A1 Sep. 30, 2021

(30) Foreign Application Priority Data
Aug. 12, 2016 (WO) ................ PCT/CN2016/094885

(51) Int. Cl.
*C08F 2/26* (2006.01)
*C08F 2/30* (2006.01)
*C09K 23/00* (2022.01)

(52) U.S. Cl.
CPC ............... *C08F 2/26* (2013.01); *C08F 2/30* (2013.01); *C09K 23/00* (2022.01); *C09K 23/018* (2022.01)

(58) Field of Classification Search
CPC .......... C08F 2/26; C08F 2/30; B01F 17/0057; B01F 17/0092
USPC ........................................................ 524/745
See application file for complete search history.

(56) References Cited

U.S. PATENT DOCUMENTS

| | | | |
|---|---|---|---|
| 6,346,509 B1 | 2/2002 | Kadono et al. | |
| 6,878,763 B2 | 4/2005 | Blease et al. | |
| 7,683,142 B2 | 3/2010 | Lai et al. | |
| 8,334,323 B2 | 12/2012 | Varineau et al. | |
| 9,555,385 B2 | 1/2017 | Shen et al. | |
| 10,016,733 B2 | 7/2018 | Shen et al. | |
| 2003/0114561 A1 | 6/2003 | Goldstein et al. | |
| 2005/0119146 A1 | 6/2005 | Rodrigues et al. | |
| 2008/0262132 A1 | 10/2008 | Roloff et al. | |
| 2011/0092406 A1 | 4/2011 | Raney et al. | |
| 2014/0114006 A1 | 4/2014 | Palmer, Jr. et al. | |
| 2015/0224462 A1* | 8/2015 | Shen .................... | C08G 65/326 516/20 |
| 2015/0367307 A1* | 12/2015 | Shen .................... | B01F 17/0092 524/831 |

FOREIGN PATENT DOCUMENTS

| | | |
|---|---|---|
| JP | H11349611 | 12/1999 |
| JP | 2001162980 | 6/2001 |

OTHER PUBLICATIONS

B. Wahle ["New Environment-Friendly Surfactants for Textile Processing", Textilveredlung, vol. 25, Issues 6, pp. 199-205 (1990)]. (Year: 1990).*
International Preliminary Report on Patentability for related PCT Application PCT/CN2016/094885, dated Feb. 21, 2019 (7 pgs).
International Search Report & Written Opinion for related PCT Application PCT/CN2016/094885, dated Apr. 28, 2017 (13 pgs).

* cited by examiner

*Primary Examiner* — Kelechi C Egwim
(74) *Attorney, Agent, or Firm* — Brooks, Cameron & Huebsch PLLC (57) ABSTRACT

A surfactant composition including at least one alkyl alkoxylate sulfate anionic surfactant; a process for preparing the surfactant composition; and an emulsion polymerization process using the surfactant composition.

11 Claims, 2 Drawing Sheets

SURFACTANT COMPOSITION

This application is a National Stage Application under 35 U.S.C. § 371 of International Application Number PCT/CN2016/094885, filed Aug. 12, 2016 and published as WO 2018/027907 on Feb. 15, 2018, the entire contents of which are incorporated herein by reference in its entirety.

FIELD

The present invention is related to a surfactant composition; and more specifically, to a surfactant composition useful for emulsion polymerization to form emulsions.

BACKGROUND

Emulsion producers today are seeking to improve emulsion properties by using various surfactant compositions (emulsifiers). For example, desirable emulsifiers used in producing emulsions ideally should impart several improvements to the emulsions including for example emulsion properties such as low foaming, formulation stability, water resistance, mechanical stability, freeze/thaw stability, and other beneficial properties. An emulsifier having a low foaming property is beneficial in emulsion polymerization because the lower foam is produced during polymerization the more production efficiency of the product is realized.

Formulation stability is generally expressed by "calcium stability" or "calcium resistance", which means that a $CaCl_2$ aqueous solution is added into an emulsion to check the homogeneity of the emulsion. If no agglomeration or phase separation occurs in the emulsion after addition of the $CaCl_2$ within a period of 48 hours (hr), the formulation is considered stable.

Formulation stability is an important property for example during coating preparation applications. During a coating preparation, typically, an emulsion is mixed with a high concentration of calcium-containing fillers, particularly for preparing an economic grade coating. In such an embodiment, for example, in preparing 1,000 grams (g) of coating, 100 g of emulsion is mixed with several hundred grams of fillers such as calcium carbonate, calcined kaolin, or other calcium-containing materials. For example, when preparing an emulsion, the method described in Chinese GB/T 20623-2006 calls for using a concentration of $CaCl_2$ aqueous solution of 0.5 weight percent (wt %). However, it is known that producers and users of emulsions often use a concentration of $CaCl_2$ aqueous solution exceeding 0.5 wt % such as in the range of from about 5 wt % to about 10 wt %.

Mechanical stability is another important property for example during coating preparation applications. During coating preparation, typically, an emulsion is mixed with several additives/fillers by mechanical stirring in a vessel or reactor. And, the trend for mixing the emulsion components in the reactor for coating preparation is to use a bigger and bigger sized reactor. Thus, it is important that the emulsion exhibits mechanical stability against the shearing effect of the mixing equipment. For example, when preparing an emulsion, the method described in Chinese GB/T 20623-2006 entitled "Emulsion for Architectural Coating", can be used; and this publication calls for test conditions wherein no agglomeration appears in the resulting emulsion after high speed dispersion (e.g., 4,000 rotations per minute [rpm] for 30 minutes [min]).

Freeze/thaw stability is still another important property for example during coating preparation applications. For example in a coating application, the freeze/thaw stability of a coating emulsion is the capability of the emulsion to resist the temperature variation during storage of the coating emulsion. For example, the method described in the above publication Chinese GB/T 20623-2006 can be used; and this publication calls for test conditions wherein no agglomeration is present in the emulsion after passing 3 cycles: 1 cycle is equivalent to the storage of the emulsion at −5° C.+/−2° C. for 18 hr followed by storage of the emulsion at room temperature (about 25° C.) for 6 hr.

U.S. Pat. No. 8,334,323 B2 discloses a surfactant composition having the following chemical formula:

wherein $R_1$ and $R_2$ are each independently hydrogen or a linear or branched alkyl group containing from 1 to 18 carbon atoms, provided that $R_1$ and $R_2$ together contain from about 8 to 18 carbon atoms; $R_3$ is hydrogen or an alkyl radical containing from 1 to 6 carbon atoms; $R_4$ and $R_5$ are each independently hydrogen or an alkyl radical containing from 2 to 6 carbon atoms; in is an average value ranging from 0 to 10 and n is an average ranging from 3 to 40, provided that the group containing m and the group containing n may be exchanged with one another as to position; and z is an average ranging from 0.5 to 5.

The above U.S. Pat. No. 8,334,323 B2 describes a nonionic surfactant composition, but the patent does not teach a combination of anionic and nonionic surfactants; and the patent does not teach that such nonionic surfactant compositions can be used in an emulsion polymerization process.

U.S. Pat. No. 6,346,509 B1 discloses a production method of a higher secondary alcohol alkoxylate compound having the following chemical structure:

wherein the long-chain olefin is a non-cyclic hydrocarbon of 8 to 30 carbon atoms; $R_1$ and $R_2$ are each independently hydrogen or a linear or branched alkyl group containing from 7 to 29 carbon atoms; A represents a lower alkylene group; n represents a number in the range of 1 to 50 on average; and B represents a hydrogen or $SO_3M$, wherein M represents a cation.

U.S. Pat. No. 6,346,509 B1 discloses that (poly)alkylene glycol is essentially ethylene glycol and that alkylene oxide is ethylene oxide. However, the above patent does not disclose a surfactant structure that contains both ethylene oxide (EO) and butylene oxide (BO) (0.5<m<5); a combination of anionic and nonionic surfactants; or the use of the combined surfactants in an emulsion polymerization process.

It would be an advantage in the industry to prepare high-performance environment-friendly anionic surfactants useful in emulsion polymerization as well as useful in other applications such as textile processing, cleaning, agrochemicals, and the like.

SUMMARY

In one embodiment, the present invention is directed to a surfactant composition useful in emulsion polymerization. The surfactant composition includes at least one alkyl alkoxylate sulfate anionic surfactant.

In another embodiment, the present invention includes a combination of: (a) at least one alkyl alkoxylate sulfate anionic surfactant; (b) at least one first nonionic alkyl alkoxylate 1 surfactant: and (c) water.

Other embodiments of the present invention include a process for preparing the surfactant composition; and an emulsion polymerization process using the surfactant composition.

In the present invention, an environmentally benign secondary alcohol alkoxylate nonionic surfactant is transformed to an anionic sulfate surfactant via a classic Chemithon sulfation process. The resulting novel anionic sulfate surfactant of the present invention is then blended with its nonionic precursor. The blend of the above two surfactants exhibits improved surfactant properties. For example, the surfactant composition of the present invention has several beneficial properties including surface tension, critical micelle concentration (CMC), foaming profile and wetting performance. Generally, the surface tension of a solution is compared to water to determine how well the solution can "wet" a surface. The lower the surface tension, the quicker the solution "wets" the surface. CMC herein means the lowest surfactant concentration required to form enough micelles to achieve a lowering of the equilibrium surface tension. Basically, the surfactant with a low CMC is more efficient in the emulsion polymerization application. In terms of surface tension, CMC, foam profile, and wetting performance properties of the surfactant composition of the present invention, "low" is relative to the benchmark of the product Disponil™ FES-993, a commercial surfactant product available from BASF.

The novel anionic surfactant composition of the present invention is advantageously used in emulsion polymerization. A styrene-butyl acrylate (St-BA) emulsion that is polymerized with the sulfated surfactant of the present invention shows an impressive $Ca^{2+}$ stability, low dynamic surface tension properties and improved water resistance in comparison with an emulsion polymerized with a known surfactant such as BASF Disponil FES 993. Enhanced $Ca^{2+}$ stability is regarded as an improvement in formulation stability and storage stability since numerous inorganic/organic additives/fillers in the downstream emulsion applications may impact the latex particle dispersity, and emulsion stability. In certain applications (for example, in adhesive applications), a quick wetting or adsorption on base-substrate is expected, where low dynamic surface tension plays a more significant role. Additionally, a good water resistance is always welcome in both architectural coatings and wood coatings, since water adsorption is influential to keep good coating appearance and good coating properties.

It is desirable to prepare a sulfated surfactant composition that provides improved properties when used in emulsion polymerization. It is also desirable to prepare a sulfated surfactant composition that advantageously provides a more environmentally benign surfactant composition; and a surfactant composition with enhanced properties such as formulation stability, low foaming, quick wetting properties, and the like.

BRIEF DESCRIPTION OF THE DRAWINGS

For the purpose of illustrating the present invention, the drawings show a form of the present invention which is presently preferred. Therefore, the following drawings illustrate non-limiting embodiments of the present invention wherein:

FIG. 1 shows that styrene acrylate emulsions of Example 4 (which uses the surfactant composition of Example 1) and Example 5 (which uses the surfactant composition of Example 2) have lower DST than Comparative Example B (which uses the surfactant of Comparative Example A). In general, the results described in FIG. 1 follow the general trend of surface tension for surfactant compositions, i.e., the surface tension of Example 5 is less than the surface tension of Example 4, which in turn, is less than the surface tension of Comparative Example B.

FIG. 2, shows that the initial foam height of Example 4 (which uses the surfactant composition of Example 1) is slightly lower than the other Examples; and, the foaming collapse of Example 4 is relatively quick, i.e., occurring in the first 3 min. The foam profile of Example 5 (which uses the surfactant composition of Example 2) is similar to that of Comparative Example B (which uses the surfactant of Comparative Example A).

DETAILED DESCRIPTION

An "emulsion", "emulsion solution", "emulsion formulation", or "emulsion composition" herein interchangeably means a copolymer in the form of small particles (e.g., usually <500 nm) emulsified by an surfactant composition and dispersed in an aqueous system.

A "foam" or "foaming" value herein means a value as determined by Ross-Miles foam test method and compared to a benchmark value for FES-993 product.

"Formulation stability" herein means a stability measurement generally expressed by Calcium stability or Calcium resistance.

"Mechanical stability" herein means a stability measurement based on the shearing effect exhibited by an emulsion during a coating preparation.

"Freeze/thaw stability" herein means a stability measurement based on the resistance of an emulsion, such as for a coating, to temperature variation during the storage of the emulsion.

"Water resistance" herein is indicated by a measurement of water whitening of a film prepared from an emulsion, after immersing a substrate coated with a dried emulsion film in water for a certain period; and once the water penetrates between the dried emulsion film and the substrate. Water whitening occurs because surfactant and salts, which are trapped in the interstices between particles, swell with water to become large enough to exhibit a refractive index different from the polymer and to scatter light. As a result, the less whitening effect occurs, the better the water whitening resistance.

In its broadest scope, the present invention is directed to a novel surfactant composition including at least one alkyl alkoxylate sulfate anionic surfactant. In one embodiment, the at least one alkyl alkoxylate sulfate anionic surfactant can be a surfactant having the following formula:

Structure (I)

In the formula of Structure (I), $R_1$ and $R_2$ are each independently hydrogen or a linear or branched alkyl group containing from 1 to about 18 carbon atoms, provided that $R_1$ and $R_2$ together contain from about 8 to about 18 carbon atoms; $R_3$ is hydrogen or an alkyl radical containing from 1 to about 6 carbon atoms; $R_4$ and $R_5$ are each independently hydrogen or an alkyl radical containing from 2 to about 6 carbon atoms; m is an average value ranging from 0 to about 10 and n is an average ranging from about 3 to about 40, provided that the group containing m and the group containing n may be exchanged with one another as to position; z is an average ranging from about 0.5 to about 5; and M is a cation.

Examples of the at least one alkyl alkoxylate sulfate anionic surfactant may include one or more of ethylene oxide, propylene oxide, butylene oxide, and mixtures thereof.

The concentration of the alkyl alkoxylate sulfate anionic surfactant of the present invention may range generally from 10 wt % to about 80 wt % in one embodiment, and from about 20 wt % to about 70 wt % in another embodiment, and from about 30 wt % to about 60 wt % in still another embodiment, based on the total weight of the components in the final surfactant composition.

In one embodiment of the present invention, the alkyl alkoxylate sulfate anionic surfactant can be a resultant product from subjecting a nonionic alkyl alkoxylate surfactant (a precursor to the alkyl alkoxylate sulfate anionic surfactant) to a sulfation process. For example, the nonionic alkyl alkoxylate surfactant precursor can be selected from known nonionic surfactants. For example, the nonionic alkyl alkoxylate surfactant precursor can include a surfactant available under the tradename of ECOSURF™, which are surfactants commercially available from The Dow Chemical Company. ECOSURF™ is a trademark of The Dow Chemical Company.

The nonionic alkyl alkoxylate surfactant precursor selected for the sulfation process may have some properties such as for example excellent wetting performance and exceptional cleaning performance compared to other known surfactants. The surfactant precursor may also be readily biodegradable per OECD 301 F and thus have an acceptable environmental profile.

In an alternative embodiment of the present invention, the surfactant composition can include a combination of: (a) at least one alkyl alkoxylate sulfate anionic surfactant; (b) at least one first nonionic alkyl alkoxylate 1 surfactant: and (c) water.

The at least one first nonionic alkyl alkoxylate 1 surfactant, component (b), of the present invention may include surfactants having the following formula:

Structure (II)

In the formula of Structure (II), $R_1$ and $R_2$ are each independently hydrogen or a linear or branched alkyl group containing from 1 to about 18 carbon atoms, provided that $R_1$ and $R_2$ together contain from about 8 to about 18 carbon atoms; $R_3$ is hydrogen or an alkyl radical containing from 1 to about 6 carbon atoms; $R_4$ and $R_5$ are each independently hydrogen or an alkyl radical containing from 2 to about 6 carbon atoms; m is an average value ranging from 0 to about 10 and n is an average ranging from about 3 to about 40, provided that the group containing m and the group containing n may be exchanged with one another as to position; z is an average ranging from about 0.5 to about 5.

In one embodiment, the above first nonionic alkyl alkoxylate 1 surfactant, component (b), can be for example the nonionic alkyl alkoxylate surfactant described above (i.e., the precursor for the alkyl alkoxylate sulfated anionic surfactant) prior to subjecting the nonionic surfactant to a sulfation process. For example, ECOSURF™, used alone or in combination with other nonionic surfactants, can be the nonionic alkyl alkoxylate surfactant useful as component (b). Other examples of component (b) useful in the present invention may include one or more of ethylene oxide, propylene oxide, butylene oxide, and mixtures thereof.

The concentration of the first nonionic alkyl alkoxylate 1, component (b), of the present invention may range generally from 0 wt % to about 40 wt % in one embodiment, from about 0.01 wt % to about 40 wt % in another embodiment, from about 0.1 wt % to about 30 wt % in still another embodiment, and from about 1 wt % to about 20 wt % in yet another embodiment, based on the total weight of the components in the final surfactant composition.

Some of the beneficial properties that the first nonionic alkyl alkoxylate 1, component (b), provides to the surfactant composition include for example an excellent wetting property, a low foaming property, and a reduced CMC.

Any type of water, component (c), can be used in the surfactant composition of the present invention including tap water, distilled water, deionized water and the like.

The concentration of the water, component (c), added to the emulsion composition is sufficient to may make up the difference in total content of the components of the emulsifier. For example, the water can range generally from 0 wt % to about 80 wt % in one embodiment, from about 20 wt % to about 80 wt % in another embodiment, from about 25 wt % to about 75 wt % in still another embodiment, and from about 40 wt % to about 70 wt % in yet another embodiment, based on the total weight of the components in the final surfactant composition.

The water, component (c), is preferably used in the surfactant composition to provide an appropriate flowability for easy handling during the emulsion production process.

The surfactant composition of the present invention may also include one or more optional components as component (d). For example, optional component (d) can be at least one second nonionic alkyl alkoxylate 2 surfactant including a nonionic surfactant with the following formula:

$$R_6O\text{-}(AO)_z\text{—}H \quad (III)$$

wherein, $R_6$ is linear or branched alkyl chain containing from 1 to about 24 carbon atoms (C6-C24); AO is an alkylene oxide group or blocks of alkylene oxide groups containing from 2 to about 4 carbon atoms (C2-C4); and z is a numeral in the range of from 1 to about 50. Some examples of optional component (d) may include for instance one or more of ethylene oxide, propylene oxide, butylene oxide, and mixtures thereof.

The concentration of the optional second nonionic alkyl alkoxylate 2, component (d), of the present invention, when used, may range generally from 0 wt % to about 80 wt % in one embodiment, from about 0.01 wt % to about 75 wt % in another embodiment, and from about 0.1 wt % to about 70 wt % in still another embodiment, based on the total weight of the components in the final surfactant composition.

Some of the beneficial properties that the second nonionic alkyl alkoxylate 2, component (d), may impart to the emulsion composition may include for example a further improvement of the emulsion stability.

Other optional additives with or without the second nonionic alkyl alkoxylate 2 surfactant may be used in the surfactant composition of the present invention, such as other nonionic and anionic surfactants, at the concentrations described above with reference to the second nonionic alkyl alkoxylate 2 surfactant.

In a broad embodiment, the process of the present invention includes sulfation of the at least one alkyl alkoxylate sulfate anionic surfactant. The process and type of equipment used to prepare the surfactant composition of the present invention includes sulfation of the at least one alkyl alkoxylate sulfate anionic surfactant in a conventional sulfation reactor or vessels known in the art. For example, the preparation of the surfactant composition of the present invention can be achieved by sulfation of the at least one alkyl alkoxylate nonionic surfactant, in known equipment, and optionally in combination with optional components and/or any other desirable additive. The preparation of the surfactant composition of the present invention, and/or any of the steps thereof, may be a batch or a continuous process.

The surfactant composition is prepared in a vessel at a temperature enabling the preparation of an effective surfactant composition. In a preferred embodiment, the process of preparing the surfactant composition is a continuous process including sulfation, neutralization by employing a NaOH water solution, and dilution with water. Generally, after neutralization and dilution, the temperature of the final surfactant composition can be about 40° C.

In an alternative embodiment of the present invention, the process of the present invention includes sulfation or mixing (blending) together a combination of: (a) at least one alkyl alkoxylate sulfate anionic surfactant; (b) at least one first nonionic alkyl alkoxylate 1 surfactant: and (c) at least water; and if desired, optional component (d), to form the surfactant composition.

In one preferred embodiment, the general process of preparing a surfactant composition of the present invention includes, for example, the following steps:

Step (1): A nonionic surfactant precursor may first be processed through a sulfation process, such as the Chemithon sulfation process via sulfur trioxide, to form an anionic surfactant. The Chemithon sulfation process, well known in the prior art, may be used in a preferred embodiment of the present invention for several reasons including for example because the process provides better impurity profile control and the process does not produce a HCl by-product.

Step (2): After the above sulfation process of step (1), the resulting surfactant may be promptly neutralized with NaOH (32 wt % of aqueous solution) to a pH of from about 7 to about 9 to form the salt of sulfate surfactant and then the sulfate surfactant may be diluted to a 30 wt % solid content.

Step (3): The sulfated surfactant from step (2) may be mixed with an optional nonionic surfactant (d) to form the final surfactant composition of the present invention at a 30 wt % solid content. The nonionic surfactant precursor content in the surfactant composition can be controlled in the above sulfation step (1) of the process by changing the molar ratio of nonionic surfactant precursor/$SO_3$.

The surfactant composition that is prepared by the above process of the present invention exhibits several unexpected and unique properties; and several improvements of the surfactant composition are imparted to the emulsion polymerization composition. For example, important properties of the surfactant composition can include improved $Ca^{2+}$ stability, low foaming, quick foam collapse, low surface tension properties, and improved water whitening resistance performance as described above.

Generally, the $Ca^{2+}$ stability performance property of the surfactant composition can be dependent on the different concentration of the $CaCl_2$ aqueous solution (aq. soln.). As an illustration of the present invention, the $Ca^{2+}$ stability performance property of the surfactant composition can be greater than 25 wt % of $CaCl_2$ in 1 wt % aq. soln. of the surfactant solution in one embodiment, and between about 22 wt % and 24 wt % of $CaCl_2$ in 1 wt % aq. soln. of the surfactant solution in another embodiment. The $Ca^{2+}$ stability performance property of the surfactant composition may be measured by the procedure described in GB/T-7381-2010.

Another beneficial property of the surfactant composition (emulsifier) of the present invention is the surfactant composition's low foaming property and quick foam collapse property as determined using the Ross-Miles Foam Height Test as described in GB/T-7462-94. The Ross-Miles foam test method records the foam height from 0 min to 5 min. A low foam means the foam's initial foam height at t=0 min. The surfactant composition, in general, has a final Ross-Miles Foam Height value in the range of less than 80 millimeters (mm) in one embodiment, less than 25 mm in another embodiment, less than 20 mm in still another embodiment and less than 15 mm in yet another embodiment for a surfactant concentration at 0.2 wt % aq. soln. in one embodiment. A "quick foam collapse" includes, for example, a low foam of less than 80 mm at t=5 min which indicates a surfactant composition's quick foam collapse.

Another beneficial property that the emulsifier exhibits is a low surface tension. Generally, the low surface tension of the emulsifier can be less than 38 mN/m in one embodiment, and from about 32 to about 35 mN/m in another embodiment. The surface tension of the emulsifier can be measured following the procedure of GB/T-5549-2010. Surface tension values may be plotted against the logarithm of concentration and critical micelle concentration (CMC) can be determined from the break point of the plot.

Still another property that the surfactant composition exhibits is the surfactant's improved wetting ability. Generally, the improved wetting time can be less than 60 seconds (s) at a surfactant concentration of 0.5 wt % aq. soln. in one embodiment; and between about 20 s to about 40 s at a surfactant concentration of 0.5 wt %. aq. soln. in another embodiment. The wetting performance of the surfactant composition can be determined by using the procedure described in GB/T 11983-2008.

Yet another property that the surfactant composition exhibits is the surfactant composition's alkaline resistance property. Generally, the alkaline resistance of the surfactant composition can be greater than about 7.0 wt % of NaOH in 1 wt % aq. soln. of the surfactant solution in one embodiment; and, between 6.0 wt % and 7.0 wt % of NaOH in 1 wt % aq. soln. of the surfactant solution in another embodiment. The alkaline resistance of the surfactant composition can be determined by using the procedure described in GB/T 5556-2003.

Because of the beneficial properties exhibited by the surfactant composition, the surfactant composition of the present invention is advantageously used in an emulsion polymerization application. The surfactant composition can impart to the emulsion polymerization at least some of its properties as described above such as for example improved $Ca^{2+}$ stability, low foaming and quick foam collapse, quick wetting and low surface tension properties. As described above, the process of the present invention includes the preparation of a high-performance environment-friendly surfactant composition which in turn can be used in emulsion polymerization. Other applications where the surfactant composition is useful may include for example textile processing, cleaning, agro-chemicals, and the like.

The surfactant composition of the present invention utilizes a surfactant composition comprising the derivative of a secondary alcohol ethoxylate-butoxylate which is useful in an emulsion polymerization application. The composition of the present invention advantageously does not contain an alkyl phenol ethoxylate (APE) surfactant, i.e., the composition of the present invention is an APE-free surfactant. In one embodiment, the surfactant composition can be used in the emulsion polymerization (EP) of various monomers recipes. For example, the product to polymerize can be styrene-butyl acrylate ("St-BA"). Other monomers that can be polymerized may include for example, styrene-butadiene, and the like; and mixtures thereof.

The process for carrying out the emulsion polymerization includes the following general steps:

Step (1): pre-emulsify the surfactant composition with sodium bicarbonate, water and above mentioned monomers in a flask while stirring the mixture at room temperature for about 30 min;

Step (2): add the second part of surfactant composition and water into the reactor; and, start heating to the temperature in the range of from about 80° C. to about 90° C.;

Step (3): add the first part of ammonium persulfate into the reactor; then, start dropwise addition of pre-emulsion with the second part of ammonium persulfate during 3 hr;

Step (4): after the addition of step (3), keep the mixture at the same temperature for 1 hr such that an emulsion polymerization is performed;

Step (5): once the emulsion polymerization from step (4) is cooled down to 65° C., add a re-dox initiator to further consume the residual monomers remaining in the emulsion for 30 min;

Step (6): cool down the emulsion to 40° C.;

Step (7): adjust the pH of the emulsion to a pH of from about 7 to about 8 using aqueous ammonia; and Step (8): filter the emulsion to obtain the polymer emulsion.

As described above, the surfactant composition that is prepared by the process of the present invention exhibits several unexpected and unique properties; and several improvements of the surfactant composition can be imparted to the emulsion polymerization composition. For example, the properties of the resulting emulsion polymerization product can include low dynamic surface tension, low foaming, and increased $Ca^{2+}$ stability.

As an illustration of the present invention, the $Ca^{2+}$ stability of the emulsion prepared with the inventive surfactant composition can be greater than 25 wt % of $CaCl_2$ (10 wt % aq. soln.) in one embodiment, and greater than 35 wt % of $CaCl_2$ (10 wt % aq. soln.) in another embodiment. The $Ca^{2+}$ stability performance property of the emulsion may be measured by the procedure described in GB/T-20623-2006.

Another beneficial property of the emulsion with the inventive surfactant composition is the low dynamic surface tension. The dynamic surface tension ranges from about 48.5 mN/m at 1 bubble/sec to about 54.0 mN/m at 10 bubble/sec in one embodiment, from about 46.5 mN/m at 1 bubble/sec to about 51.5 mN/m at 10 bubble/sec in another embodiment. The dynamic surface tension of emulsions may be measured by the Max Bubble Pressure test method.

One more beneficial property of the emulsion with the inventive surfactant composition is the improved water whitening resistance. Lab color values were measured immediately when the immersed part was just exposed in air. The smaller L indicates the less whitening effect occurs, the better the water whitening resistance. Lab represents the lightness of the color (L=0 yields black and L=100 indicates diffuse white). The L value is less than 30 in one embodiment, and less than 24 in another embodiment.

EXAMPLES

The following Examples further illustrate the present invention in more detail but are not to be construed to limit the scope thereof.

The following raw materials or components are used for preparing the emulsions described in the Examples and Comparative Examples:

A butylene oxide-capped, linear secondary alcohol alkoxylate described in Example 1 of U.S. Pat. No. 8,334,323 B2 is used as the nonionic surfactant component in the following examples.

Disponil™ FES-993 is a surfactant composition containing about 20 wt % of nonionic surfactants, and commercially available from BASF. Disponil FES-993 is used "as is" when received from BASF.

Sulfur is purchased from Sinopec Shanghai and used "as is" when received. The sulfur is transformed to sulfur dioxide and then to sulfur trioxide in the laboratory by known methods.

Aqueous solution of NaOH (32 wt % aq. soln.) is purchased on the market and used "as is" when received.

General Procedure for Preparing the Surfactant Composition

The surfactant composition used in the examples is prepared in accordance with the following general procedure:

Step (1): A nonionic surfactant precursor (e.g., secondary alcohol ethoxylate and butoxylate) may be firstly processed through a sulfation process, such as Chemithon sulfation process via sulfur trioxide, to form an anionic surfactant. The Chemithon sulfation process is preferable because the process provides better impurity profile control and no HCl by-product is produced with such process.

Sulfation by the Chemithon process is a continuous process that is well known in the industry. The reaction kinetics of the process may depend on feeding ratios, column length, column design (to offer a maximum contact surface of sulfur trioxide and nonionic precursor) and the like. Such variables for the Chemithon process can be readily determined by those skilled in the art.

Step (2): The resulting anionic surfactant from the above sulfation process of step (1) can then be promptly neutralized using a NaOH (32 wt % aq. soln.) to a pH of from about 7 to about 9 to form the salt of sulfate surfactant.

Step (3): The salt of sulfate surfactant from step (2) may be diluted with water to form the final surfactant composition of the present invention.

In carrying out the general sulfation process, step (1) of the above general process, a pre-heated nonionic surfactant (pre-heated to about 40° C.) is firstly contacted with an air-diluted liquid sulfur trioxide in a continuous thin-film reactor. It is a relatively quick and exothermic reaction.

A typical sulfation process via sulfur trioxide can be described as shown in the following sulfation scheme (I):

The molar ratio of sulfur trioxide ($SO_3$) to nonionic surfactant could be maintained in the range of from about 0.80 to about 1.02 by adjusting the nonionic surfactant flow rate. Generally, the nonionic surfactant flow rate can be from about 15 kilograms per hour (kg/hr) to about 30 kg/hr in one embodiment with reference to 1 kg/hr consumption of sulfur; and from about 20 kg/hr to about 25 kg/hr in another embodiment with reference to 1 kg/hr consumption of sulfur. According to the application needs, the above molar ratio range is set in order to keep a certain ratio of nonionic surfactants in the final product. Precise control of the molar ratio of $SO_3$ to nonionic surfactant is carried out in order to produce high quality alkyl alkoxylate sulfate; and particularly for example, to minimize the formation of undesirable 1, 4-dioxane. A crude sulfuric ester acid is collected at about 55° C.

In carrying out step (2), the neutralization process step of the above general process, a prompt neutralization of the crude sulfuric ester acid is carried out using NaOH or $NH_4OH$. The prompt neutralization is used to avoid dark color and to keep a good impurity profile.

In the Examples and Comparative Examples, the following standard measurements, analytical equipment, and methods are used:

Surfactant Test Methods (a) Active Ingredient

The active ingredient of the emulsifier may be determined by a titration method following the procedure described in GB/T-5173-1995, in which the titration of the anionic active content is carried out with a standard volumetric cationic solution in the presence of an indicator consisting of an acidic mixture.

(b) Surface Tension and CMC Measurements

An aqueous solution of a surfactant at 4000 parts per million (ppm) may be prepared as a mother solution and a series of solution samples at lower concentrations down to 1 ppm may be prepared by diluting the mother solution. The surface tension of each sample solution can be measured following the procedure described in GB/T-5549-2010. Surface tension values can be plotted against concentration and the critical micelle concentration (CMC) can be determined from the break point of the plot.

(c) Ross-Miles Foam Height Test

The foaming property of surfactant composition may be determined using a Ross-Miles Foam Height Test by first preparing 300 milliliters (mL) of an aqueous solution of surfactant at 0.2 wt %; and then measuring the height of foam of the solution in accordance with the procedure described in GB/T-7462-94.

(d) Draves Wetting Measurements

The wetting resistance of a surfactant composition may be determined using the Draves Wetting Measurements by first preparing 1 liter (L) of an aqueous solution of surfactant at 0.5 wt %. Several cotton cloths can be cut at the same size. Then, in accordance with the procedure described in GB/T-11983-2008, the wetting time to the cotton cloth is recorded in the surfactant solution.

(e) Surfactant $Ca^{2+}$ Stability Test

The $Ca^{2+}$ stability of a surfactant composition may be determined using the Surfactant $Ca^{2+}$ Stability Test procedure as described in GB/T-7381-2010.

(f) Alkaline Resistance Test

The alkaline resistance property of a surfactant composition may be determined using the Alkaline Resistance Test procedure as described in GB/T-5556-2003.

(g) Viscosity Measurement

The viscosity of a surfactant composition may be determined at room temperature (20° C.), spindle #62 and at 60 rpm using the viscosity measurement procedure as described in GB/T-5561-1994.

Example 1

The surfactant composition in this Example 1 was prepared according to the following procedure:

Pre-heated (about 40° C.) nonionic surfactant precursor (secondary alcohol ethoxylates and butoxylates) was slowly poured into a lab-scale thin film falling reactor. The molar ratio of sulfur trioxide ($SO_3$) to the nonionic surfactant precursor was kept stable at about 1.01/1.00 by fine-tuning the flow rate of the nonionic precursor at about 3.0 kg/hr in the lab scale preparation. Followed with the continuous sulfation process, a batch neutralization with NaOH (32 wt % aq. soln.) was run with mechanical stirring after the collection of sulfuric ester acid.

After preparing the surfactant composition according to the above procedure, the properties of the surfactant compositions were measured using the methods described above. The results of the properties measurements are described in Table I.

Example 2

In this Example 2, the same procedure in Example 1 was followed, except that the molar ratio of $SO_3$ to the nonionic surfactant was kept stable at about 0.81/1.00 by fine-tuning the flow rate of nonionic precursor at about 3.6-3.7 kg/hr.

Comparative Example A

In this Comparative Example A, Disponil FES-993 was used as the nonionic surfactant precursor. Disponil FES-993 was obtained from BASF and used "as is" when received.

Structural analyses identifies Disponil FES-993 as a surfactant composition containing about 20 wt % of nonionic surfactants of its solid weight of total surfactant. For this reason, Example 2 described above was prepared with a weight ratio of component (a)/component (b) of 8/2.

TABLE I

Surfactant Properties

| Property | Example 1 Alkyl alkoxylate sulfate (component a) + water (component c) | Example 2 Alkyl alkoxylate sulfate (component a) + nonionic alkyl alkoxylate 1 (component b) (80:20 by weight) + water (component c) | Comparative Example A* Alkyl ether sulfate (Disponil FES-993) |
| --- | --- | --- | --- |
| Active content (wt %) | 41.2 | 44.7 | 29-31 |
| Appearance (20° C.) | clear, pale yellow | clear, pale yellow | clear, pale yellow |
| Surface Tension at CMC (mN/m, 20° C.) | 37 | 34 | 43 |
| CMC (ppm) | 250 | 200 | 500 |
| Foam Height (Ross Miles, 0/5 min at 0.2 wt %) | 110/20 | 77/15 | 120/95 |
| Draves wetting (s, 0.5 wt %) | >300 | 20.7 +/− 2.8 | >300 |
| $Ca^{2+}$ stability ($CaCl_2$, 1 wt %) | ~25 wt % | ~22 wt % | ~27 wt % |
| Anti-alkaline (NaOH, 1 wt %) | ~7 wt % | ~6 wt % | ~10 wt % |

*The origin of the sample of Comparative Example A: BASF Disponil FES-993.

In Table I above, the surfactant compositions of the present invention (Examples 1 and 2) when compared with Disponil FES-993 (Comparative Example A), showed some very useful properties including the following properties:

(1) Examples 1 and 2 have a much lower surface tension than Disponil FES-993 (Comparative Example A). In particular, the low surface tension of Example 2 is at 34 mN/m.

(2) Examples 1 and 2 have a lower CMC than Disponil FES-993 (Comparative Example A). A lower CMC could be very helpful in controlling the polymerization reaction. For example, a smaller polymer particle size may be obtained with a lower CMC.

(3) With regard to foam property, the surfactant composition of Example 2 exhibits the lowest initial foam height; and Examples 1 and 2 have a very quick foam collapse which is much quicker than Disponil FES-993 (Comparative Example A).

(4) The wetting performance of Example 2 is observed to be remarkably better than the other surfactants compositions. It is theorized that the presence of a nonionic alkyl alkoxylate 1, which is a low foam wetting agent, contributes to the wetting performance. A good wetting performance can be an advantageous and a valuable property in downstream emulsion applications.

(5) The $Ca^{2+}$ stability of Examples 1 and 2 are comparable to Disponil FES-993 (Comparative Example A).

In conclusion, Example 2 (surfactant of the present invention) generally demonstrates very useful and advantageous surfactant properties including low surface tension, low CMC, quick wetting, low foaming and quick foam collapse, and the like. All of the above properties would contribute in providing resultant emulsions with better polymerization stability, better emulsion stability, and less application defects.

Examples 4 and 5 and Comparative Example B—Emulsion Polymerization

Part A: Basic Formula Components of Emulsion

The basic formulation used in the Examples for preparing a styrene butyl acrylate emulsion includes: (a) the following monomers: butyl acrylate, styrene, acrylamide and acrylic acid; (b) an initiator such as ammonium persulfate; (c) an anionic surfactant at 0.834 phm. The glass transition temperature (Tg) of the resulting emulsion is 22° C.

Part B: Preparation of Emulsion

Basic Polymerization Procedure of the Styrene-Butyl Acrylate Emulsion

The polymerization process of the emulsion described in Part A above includes the following steps:

Step (1): Pre-emulsify the surfactant composition from Examples 1 and 2 and Comparative Example A with sodium bicarbonate, water and above mentioned monomers in a flask; and mix the compounds by continually stirring the mixture at room temperature for about 30 min;

Step (2): Add the second part of surfactant composition and water into the reactor; and, heat the reactor contents at a temperature in the range of from about 80° C. to about 90° C.;

Step (3): Add the first part of ammonium persulfate into the reactor; and then add dropwise the pre-emulsion with the second part of ammonium persulfate over a period of 3 hr;

Step (4): After the addition in step (3), maintain the temperature in the range of from about 80° C. to about 90° C. for a period of 1 hr; and then perform an emulsion polymerization of the mixture;

Step (5): Once the emulsion formed in step (4) above, cool the emulsion down to a temperature of 65° C., and then add a re-dox initiator to further consume any residual monomers and maintain this reaction mixture with stirring for 30 min; and Step (6): Cool down the resulting emulsion from step (5) to 40° C., and adjust the pH of the emulsion by adding aqueous ammonia to the emulsions; and the filter resultant emulsions to obtain a polymer emulsion after filtration.

Table II describes three emulsions that were prepared in accordance with Examples 4 and 5 and Comparative Example B.

TABLE II

Emulsions

| Example | Emulsion Type | Surfactant Composition | + Nonionic |
| --- | --- | --- | --- |
| Example 4 | styrene-acrylate | alkyl alkoxylate sulfate (composition from Example 1) | — |
| Example 5 | styrene-acrylate | alkyl alkoxylate sulfate blend (composition from ) Example 2 | — |
| Comparative Example B | styrene-acrylate | alkyl ether sulfate (surfactant from Comparative Example A) | — |

General Process for Evaluating Performance of Emulsions

The emulsions prepared as described above were evaluated to determine the emulsions' performance properties using the following tests and the resulting properties of the emulsions are set forth in Table III:

Ca²⁺ Stability Test

CaCl$_2$ aqueous solution (concentration at 5 wt % or 10 wt %) was added into 20 mL of emulsion; after manual mixing, the CaCl$_2$-containing emulsion was kept at room temperature for 48 hr. Any appearance of agglomeration or non-homogeneity in the emulsion indicates failure in the Ca²⁺ stability test. The test method refers to Chinese GB/T 20623-2006, but using a higher concentration of CaCl$_2$ aq. soln.

Polymerization Stability in Emulsion Polymerization

Filter the resulting emulsion, collect reaction aggregates in the filter, wash it by tap water, dry at ambient temperature and weigh the collection to determine the amount of aggregates. A percentage by weight of aggregates to the total weight of the emulsion was used to measure the polymerization stability. The lower the percentage of aggregates the better the polymerization stability.

Particle Size and Particle Size Distribution in Polymer Emulsion (Peak Width)

Using Zeta Potential particle analyzer (Malvern Nano ZS), an average particle diameter in the emulsion was measured.

Solid Content

The solid content measurement was done by loss-on-drying method at 150° C. for 0.5 hr.

Water Whitening Resistance Test

Add 4 wt % of film forming auxiliary agent in the emulsion; after manual mixing, emulsion film was spread on plate surface with the thickness around 100 μm. The film was dried in air at ambient temperature for 24 hr; the plate with emulsion film was then immersed in tap water. The appearance of the film was checked after 24 or 48 hr as a measure of the water whitening resistance of these emulsion films. The test method of emulsion water whitening resistance was simplified from GB/T 16777-1997, water resistance test method of architectural coatings.

TABLE III

General Emulsion Properties

| Property | Example 4 Alkyl alkoxylate sulfate (components a + c) | Example 5 Alkyl alkoxylate sulfate blend (components a + b + c) | Comparative Example B Alkyl ether sulfate (Disponil FES-993) |
| --- | --- | --- | --- |
| Solid content (wt %) | 46.1 | 46.2 | 46.2 |
| Polymerization residue (g/kg of emulsion) | 1.1 | 2.4 | 2.0 |
| Particle size (nm) | 127.9 | 137.6 | 129.5 |
| Peak width (nm) | 28.2 | 31.8 | 29.2 |
| pH | 8.3 | 8.3 | 8.4 |
| Viscosity (cP, #63 spindle, 100 rpm, 25° C.) | 640 | 455 | 385 |
| Ca²⁺ stability | >100% CaCl$_2$ (10 wt % aq. soln.) | >100% CaCl$_2$ (10 wt % aq. soln.) | >75% CaCl$_2$ (10 wt % aq. soln.) |

As described by the results in Table III, Example 4 delivered an emulsion with very similar properties as Comparative Example B. For example, the particle size and its distribution for Example 4 was similar to Comparative Example B; and less polymerization residue was recorded for Example 4 than Comparative Example B.

Generally, an anionic surfactant is more effective in particle size control. Thus, the results of Table III show that the presence of a nonionic surfactant in Example 5 results in an emulsion with a slightly bigger particle size than the other emulsions of Example 4 and Comparative Example B.

The Ca²⁺ stability of all the three emulsions of Table III were much better than the Ca²⁺ stability determined by the GB/T-20623-2006 standard method; while the emulsions of Examples 4 and 5 were extremely good to pass 100% CaCl$_2$ (10 wt % aqueous solution); and the emulsion with FES-993 (Comparative Example B) only passed 75% CaCl$_2$ (10 wt % aqueous solution).

In general, the emulsions of Examples 4 and 5 delivered a more balanced performance compared to the emulsion of Comparative Example B. In particular, the Ca²⁺ stability of the emulsions to numerous fillers/additives is a tremendously important property, for example, for the coating stability of architectural coating formulations.

Dynamic Surface Tension

Surface tension is an extremely important surfactant property and impacts the properties of the surfactant such as foam formation, stability of the surfactant, and the wettability of the surfactant solution and the like. In certain applications where high coating speed is needed, Dynamic Surface Tension (DST) is considered as an indicator of wetting performance. In the examples, the DST of three emulsions was measured to differentiate the emulsions' wetting performance; and Disponil FES-993 was used as a comparative example of surfactant.

The test method, Max-Bubble Pressure Method, is commonly used to measure the DST for systems/compositions containing surfactants. In the Max-Bubble Pressure Method, a tensiometer produces air-bubbles at a constant rate and blows the bubbles through a capillary (with a known radius) which is submerged in a sample liquid. The pressure inside of the air bubble continues to increase as the bubble passes through the capillary; and the maximum pressure value is obtained when the bubble has a completely hemispherical shape whose radius exactly corresponds to the radius of the capillary. The surface tension can be determined using the Young-Laplace equation in the reduced form for spherical bubble shape within the liquid as follows:

$$\sigma = \frac{\Delta P\max \times Rcap}{2};$$

wherein σ is surface tension; ΔPmax is maximum pressure drop; and Rcap is the radius of the capillary.

Water is used to reduce the viscosity of the emulsions. A diluted emulsion solution (40 mL) is prepared with 50 percent (%) of its initial solid content.

Figure 1:
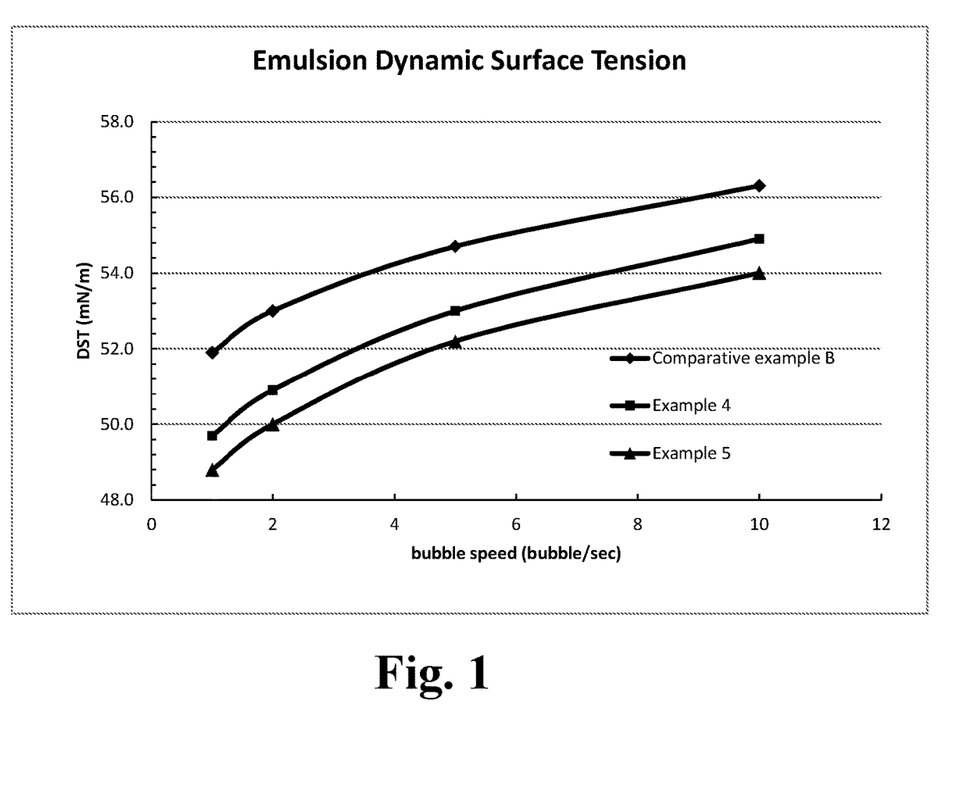
FIG. 1 is a graphical illustration showing an emulsion dynamic surface tension property comparison between samples of the present invention and samples of comparative examples.

FIG. 1 illustrates a comparison of Emulsion Dynamic Surface Tension (DST) property of the Examples. In FIG. 1, the St-Acrylate emulsions of Example 4 and Example 5 had lower DST than the emulsion of Comparative Example B. Overall, the results shown in FIG. 1 are good results in accordance with the surface tension of the emulsifiers: Example 2<Example 1<Comparative Example A.

Emulsion Foam Height Measurement

Low foaming performance is a desirable property for emulsions because low foaming can minimize the use of a defoamer additive in downstream emulsion applications; and low foaming can also increase the production efficiency. In highly viscous emulsions, low foaming is particularly welcome to reduce product defects in both coating and adhesive applications. In the examples, low foaming is measured using Disponil FES-993 as a comparative example of surfactant.

Foam Test Method 1

A foam test method 1 is carried out using an emulsion by first pouring 200 mL of emulsion into a 500 mL plastic cup. Then, the initial emulsion height is recorded. The emulsion is continually stirred using a dispersion plate at 4000 rpm for 30 min. The emulsion foam height evolution during 30 min of stirring is recorded. There is a probable risk that the foam may spill out the plastic cup in case of high-foaming emulsion. The results of the foam test are as set forth in Table IV.

TABLE IV

Emulsion Foam Height Test Results

|  | Example 4 | Example 5 | Comparative Example B |
|---|---|---|---|
| Foam Height | 52 mm | 62 mm | 59 mm |

From the results described in Table IV, it can be found that the foam height of the emulsion of Example 4 was the lowest among the three emulsions described in Table IV. Although the surfactant composition of Example 5 is low-foaming with quick foam collapse, the resulting emulsion of Example 5 has slightly higher foam than the emulsion of Comparative Example B.

After high speed dispersion, the low final foam height of the emulsion indicates the low foam profile of the surfactant composition.

One difference between Example 4 and 5 is Example 5 contains a concentration of component (b) in the surfactant composition.

Foam Test Method 2

In this foam test method 2, an emulsion is firstly diluted to a 1% active aqueous solution. Secondly, 250 mL of the diluted emulsion is placed into a test tube. The aqueous emulsion solution is air-bubbled for 1 min; then, the bubbling is stopped and the foam height recorded. The foam height evolution in the next 5 min is recorded.

The above testing is carried out in duplicate, and the results are reproducible at ±5%. The average foam height of the two duplicate tests is reported.

Figure 2:
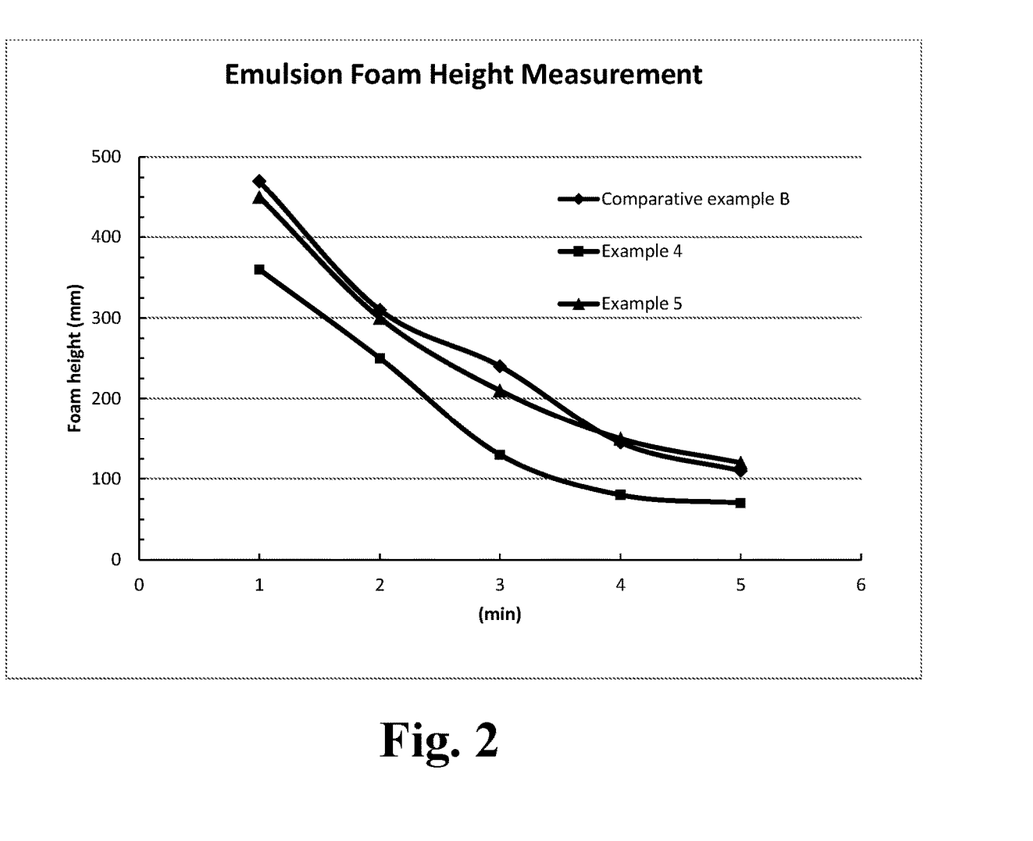
FIG. 2 is a graphical illustration showing an emulsion foam height property comparison between samples of the present invention and samples of comparative examples.

In FIG. 2, there is shown a comparison of Emulsion Foam Height property of the Emulsions. In FIG. 2, it can be found that the initial foam height of the emulsion of Example 4 was slightly lower; and, the foaming collapse of Example 4 was quite quick in the first 3 min; while, the foam profile in the emulsion of Example 5 was almost the same as the emulsion of Comparative Example B.

With regard to the above two different foam test methods, the method 2 with diluted emulsion directly reflects the defoaming property of the surfactant composition in emulsions, while the method 1 with high speed dispersion is an indication of anti-foaming ability of the surfactant composition with emulsion viscosity. Considering the difficulty in reducing the foaming of a highly viscous emulsion, it is a benefit for the surfactant composition to exhibit a certain amount of anti-foaming ability.

Based on the foam height test results from both foam test methods 1 and 2 above, the emulsion of Example 4 of the present invention had the lowest foam profile.

Water Whitening Resistance Test

Water whitening resistance is an essential emulsion property that may have an important impact in emulsion applications, particularly in coatings applications. According to the test method described in herein above, the observation of whitening appearing in an emulsion signifies water penetration through the film formed by the emulsion. Therefore, whitening can be used as a measure of film water resistance. The less whitening is visually observed in an emulsion, the better is the water whitening resistance property of the emulsion.

An emulsion film of Example 4 has less whitening than the emulsion film of Comparative Example B and the emulsion film of Example 5. According to the structure indicated in Scheme I, the presence of butylene oxide (BO) units offers not only more significant steric hindrance than ethylene oxide units, but BO units also offer more hydrophobicity to the emulsion film to enhance the resistance to water penetration. Additionally, the presence of BO units in a surfactant structure can reduce a surfactant's critical micelle concentration (CMC); consequently, an emulsion with smaller particle size is provided. And as a result, it is theorized that the smaller particle size is perhaps the reason why the emulsion film of Example 4 was slightly advantageous on water whitening resistance than the emulsion film of Example 5.

The above application tests can lead to the conclusion that the surfactant compositions of the present invention (Examples 1 and 2) impart very useful properties to the emulsions of the present invention. For example, a much stronger $Ca^{2+}$ stability was observed for the emulsion films of the present invention; consequently, a significantly enhanced coating stability can be achieved. Also, the emulsion films of the present invention exhibit a lower dynamic surface tension which can be very helpful in various applications where high coating speed is applied.

In addition, a lower foaming and quicker foam collapse property can be achieved for the surfactant composition of the present invention than the alkyl ether sulfate emulsifier, Disponil FES-993; particularly, for the surfactant composition of Example 1.

The emulsions of Examples 4 and 5 also demonstrate an improved water whitening resistance property as compared to the emulsion of Comparative Example B.

When comparing the emulsions of Examples 4 and 5 to the emulsion of Comparative Example B, the presence of a nonionic alkyl alkoxylate 1 is very helpful to improve surfactant properties; particularly for example, with regard to quick wetting. Also, the emulsion of Example 4 is observed to be more advantageous on particle size control, foaming and water resistance.

In terms of production cost, the surfactant composition of Example 1 is lower than the surfactant composition of Example 2. Therefore, the surfactant composition of Example 1 can be selected as a very competitive alternative solution to replace Disponil FES-993. When emulsion films, made from different emulsions described herein in the Examples, are subjected to water whitening resistance testing; the emulsion film of Example 4 and Example 5 has less whitening than the emulsion film of Comparative Example B. According to the emulsion film of Example 5, the presence of butylene oxide (BO) units offers not only more significant steric hindrance than an ethylene oxide unit, but also more hydrophobicity to enhance the resistance to water penetration. Additionally, the presence of BO in an emulsifier structure may reduce the emulsifier's critic micelle concentration (CMC), consequently, it is helpful to prepare the emulsion with smaller particle size. As a result, smaller particle size is perhaps the reason why the emulsion film of Example 4 was slightly more advantageous on water whitening resistance than the emulsion film of Example 5.

What is claimed is:

1. A surfactant composition comprising at least one alkyl alkoxylate sulfate anionic surfactant having the following formula (I):

(I)

wherein $R_1$ and $R_2$ are each independently hydrogen or a linear or branched alkyl group containing from 1 to 18 carbon atoms, provided that $R_1$ and $R_2$ together contain from about 8 to about 18 carbon atoms; $R_3$ is hydrogen or an alkyl radical containing from 1 to about 6 carbon atoms; $R_4$ is hydrogen and $R_5$ is an alkyl radical containing 2 carbon atoms; m is an average value ranging from 0 to 10 and n is an average ranging from about 3 to about 40, provided that the group containing m and the group containing n may be exchanged with one another as to position; z is an average ranging from about 0.5 to about 5; and M is a cation.

2. The composition of claim 1, including water.

3. The composition of claim 1, including at least one first nonionic alkyl alkoxylate 1 surfactant.

4. The composition of claim 3, wherein the at least one first nonionic alkyl alkoxylate 1 surfactant is an alkyl alkoxylate nonionic surfactant having the following formula (II):

(II)

wherein $R_1$ and $R_2$ are each independently hydrogen or a linear or branched alkyl group containing from 1 to 18 carbon atoms, provided that $R_1$ and $R_2$ together contain from about 8 to about 18 carbon atoms; $R_3$ is hydrogen or an alkyl radical containing from 1 to about 6 carbon atoms; $R_4$ is hydrogen or an alkyl radical containing from 2 to 6 carbon atoms and $R_5$ is an alkyl radical containing from 2 to about 6 carbon atoms; m is an average value ranging from 0 to about 10; and n is an average ranging from about 3 to about 40, provided that the group containing m and the group containing n may be exchanged with one another as to position; z is an average ranging from about 0.5 to about 5.

5. The composition of claim 3, wherein the at least one first nonionic alkyl alkoxylate 1 surfactant is selected from the group consisting of a secondary alcohol C12-14 ethoxylate and butoxylate.

6. The composition of claim 1, including at least one second nonionic alkyl alkoxylate 2 surfactant that is an alkyl alkoxylate nonionic surfactant having the following formula (III):

$$R_6O\text{-}(AO)_z\text{—H} \quad (III)$$

wherein, $R_6$ is linear or branched alkyl chain containing from 1 to about 24 carbon atoms (C6-C24); and AO is an alkylene oxide group or blocks of alkylene oxide groups containing from 2 to about 4 carbon atoms (C2-C4); and z is in the range of 1-50.

7. The composition of claim 1, wherein the concentration of the at least one alkyl alkoxylate sulfate anionic surfactant is in the range of from about 10 weight percent to about 80 weight percent.

8. The composition of claim 3, wherein the concentration of the at least one first nonionic alkyl alkoxylate 1 surfactant is in the range of from about 0.01 weight percent to about 40 weight percent.

9. A process for preparing a surfactant composition comprising admixing:
(a) at least one alkyl alkoxylate sulfate anionic surfactant having the following formula (I):

(I)

wherein $R_1$ and $R_2$ are each independently hydrogen or a linear or branched alkyl group containing from 1 to 18 carbon atoms, provided that $R_1$ and $R_2$ together contain from about 8 to about 18 carbon atoms; $R_3$ is hydrogen or an alkyl radical containing from 1 to about 6 carbon atoms; $R_4$ is hydrogen and $R_5$ is an alkyl radical containing 2 carbon atoms; m is an average value ranging from 0 to 10 and n is an average ranging from about 3 to about 40, provided that the group containing m and the group containing n may be exchanged with one another as to position; z is an average ranging from about 0.5 to about 5; and M is a cation;
(b) at least one first nonionic alkyl alkoxylate 1 surfactant;
(c) water; and
(d) optionally, at least one second nonionic alkyl alkoxylate 2 surfactant.

10. A polymer emulsion composition comprising the reaction product of a surfactant of claim 1; and an emulsion composition.

11. An emulsion polymerization process comprising the steps of:
(I) providing a surfactant of claim 1; and
(II) performing an emulsion polymerization of an emulsion composition containing the surfactant from step (I).

* * * * *